(12) United States Patent
Boyer et al.

(10) Patent No.: US 6,410,179 B1
(45) Date of Patent: Jun. 25, 2002

(54) FLUID FLOW PLATE HAVING A BRIDGE PIECE

(75) Inventors: Jeffrey R. Boyer, West Fulton; Franklin L. Canfield, Delmar; Jeffrey L. Zemsky, Glenmont, all of NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/552,229

(22) Filed: Apr. 19, 2000

(51) Int. Cl.$^7$ ................................................. H01M 8/04
(52) U.S. Cl. ............................. 429/39; 429/34; 429/35; 429/37; 429/38
(58) Field of Search ............................. 429/34, 35, 37, 429/38, 39

(56) References Cited

U.S. PATENT DOCUMENTS

| | | | |
|---|---|---|---|
| 4,403,018 A | 9/1983 | Alfenaar et al. | 429/34 |
| 4,590,135 A | 5/1986 | Warszawski et al. | 429/38 |
| 4,743,518 A | 5/1988 | Romanowski | 429/34 |
| 4,818,640 A | 4/1989 | Fukuda et al. | 429/38 |
| 4,945,019 A | 7/1990 | Bowen et al. | 429/72 |
| 5,200,278 A | 4/1993 | Watkins et al. | 429/24 |
| 5,234,776 A | 8/1993 | Koseki | 429/30 |
| 5,342,706 A | 8/1994 | Marianowski et al. | 429/35 |
| 5,514,487 A | 5/1996 | Washington et al. | 429/39 |
| 6,017,648 A * | 1/2000 | Jones | 429/35 |
| 6,232,008 B1 * | 5/2001 | Wozniczka et al. | 429/39 |

\* cited by examiner

Primary Examiner—Carol Chaney
Assistant Examiner—Dah-Wei Yuan
(74) Attorney, Agent, or Firm—Heslin Rothenberg Farley & Mesiti P.C.

(57) ABSTRACT

A bridge piece for a fuel cell fluid flow plate having a face and a fluid opening for receiving a fluid, at least one flow channel in the face for distributing a fluid in a fuel cell, and a first groove defined within the face, the groove adapted to receive a sealing member, includes a body having a first surface and a second surface, the first surface having at least one channel for fluidly connecting the fluid opening to the at least one flow channel. The second surface has a second groove defined therein. The second groove is adapted to receive the sealing member.

15 Claims, 8 Drawing Sheets

FLUID FLOW PLATE HAVING A BRIDGE PIECE

TECHNICAL FIELD

This invention relates generally to fuel cells and, more particularly, to fluid flow plate configuration.

BACKGROUND INFORMATION

Fuel cells electrochemically convert fuels and oxidants to electricity. A Proton Exchange Membrane (hereinafter"PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). The direction, from anode to cathode, of flow of protons serves as the basis for labeling an "anode" side and a "cathode" side of every layer in the fuel cell, and in the fuel cell assembly or stack.

In general, an individual PEM-type fuel cell may have multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid supply manifolds. As is known in the art, some of the fluid supply manifolds distribute fuel (e.g., hydrogen) and oxidant (e.g., air/oxygen) to, and remove unused fuel and oxidant as well as product water from, fluid flow plates which serve as flow field plates of each fuel cell. Other fluid supply manifolds may circulate coolant (e.g., water) for cooling the fuel cell.

Typically, the distribution of reactant gases to the various fluid flow plates in the fuel cell stack, as well as removal of unused reactant gases and water from the plates, is accomplished by the fluid flow manifolds. Each of the various components in the stack has a "manifold hole" which, when aligned, form columns that are used as fluid flow manifolds. The fluid flow manifolds conduct their respective fluids substantially perpendicular to the planes of the various fluid flow plates. If a particular plate distributes the fluid that is being conducted through a particular fluid manifold, that manifold must be in communication with that plate's flow channels.

Figure 1:
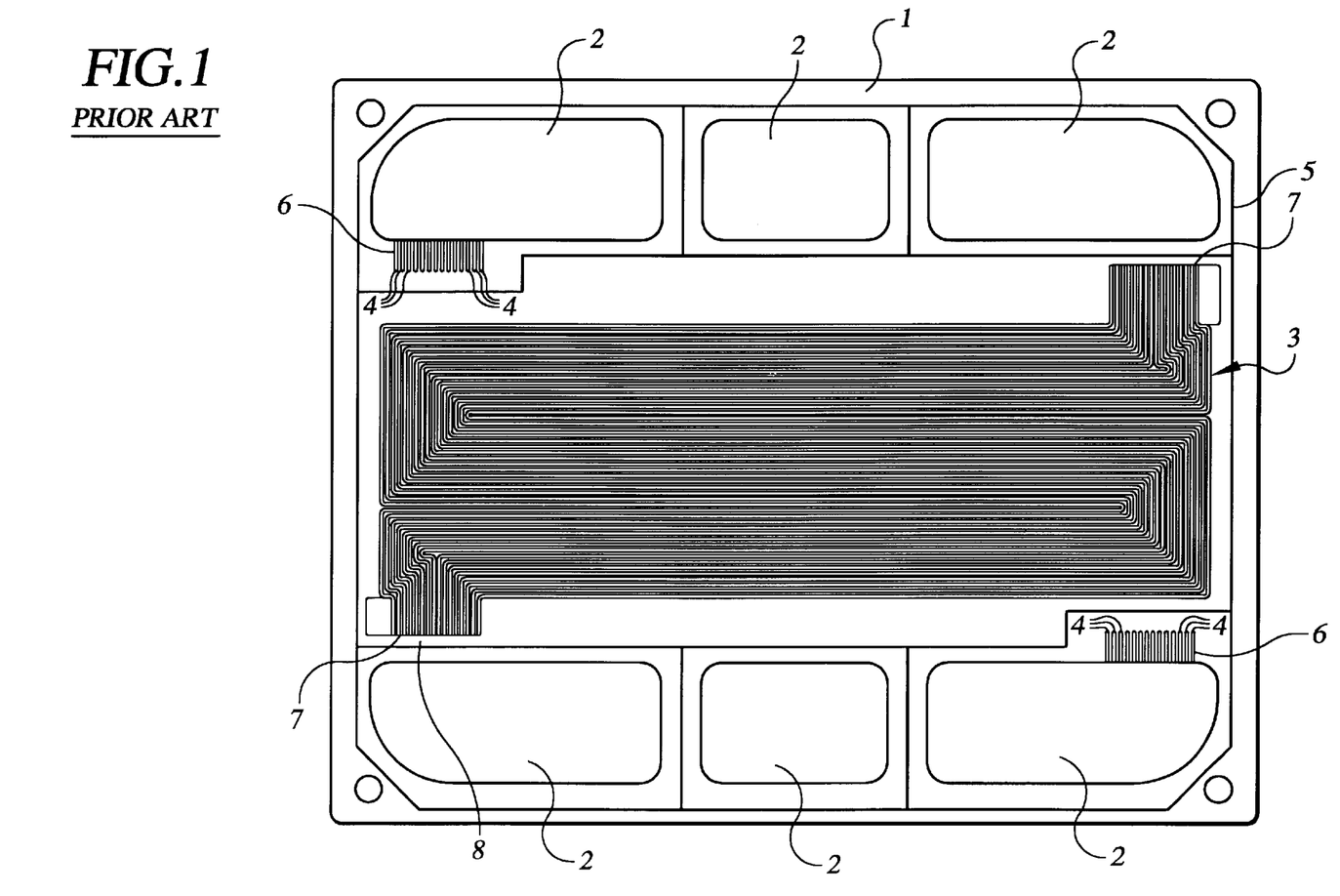
FIG. 1 is a prior art depiction of a fluid flow plate using dive through holes.

As can be seen in FIG. 1, in the prior art dive through holes have been used to fluidly connect fluid flow manifolds with their respective flow channels. Fluid flow plate 1 has a plurality of fluid flow manifolds 2, and a plurality of active area flow channels 3 located on each side of the fluid flow plate. In this example, the active area flow channels (not shown) on the opposite side of fluid flow plate 1, are connected to fluid flow manifolds 2, by use of dive through holes 4 and inlet channels 6. Similarly, flow channels 3 are connected to fluid flow manifolds 2 by the use of dive through holes 7 and inlet channels (not shown located on the opposite side of fluid flow plate 1. The dive through holes extend through fluid flow plate 1 thereby allowing fluid from the fluid flow manifolds to enter the flow channels. The use of dive through holes, creates a smooth surface 8 on the fluid face plate thereby allowing a gasket 5 to aid in the sealing of one plate to another. Gasket 5 also aids in sealing the respective fluid manifolds, thereby preventing leaking of fluid.

In such a system the gasket needs to be reversed when applied to the opposite side of fluid flow plate 1. During compression, this can result in uneven loads on the fluid flow plate which may increase the structural requirements of the fluid flow plate. Also when it is desired to use varying types of fluid flow plates, with varying configurations of flow channels fluidly connected to different fluid manifolds, various fluid flow plates must be provided. Various fluid flow plates must be separately provided, and may thus increase the overall cost of the fuel cell assembly.

Accordingly, it is desirable to provide a fluid flow plate which allows fluids to pass from the fluid manifolds directly to the flow channels without creating uneven loads on the fluid flow plates when assembled, and still providing an adequate seal.

SUMMARY OF THE INVENTION

The present invention provides, in a first aspect, a fuel cell fluid flow plate having a face and a fluid opening for receiving a fluid. The fluid flow plate has at least one flow channel in its face for distributing a fluid in the fuel cell, a first groove defined within the face to receive a sealing member, and a bridge piece having a first surface and a second surface. The first surface of the bridge piece has at least one channel for fluidly connecting the fluid opening to the at least one flow channel. The second surface of the bridge piece having a second groove defined therein to receive the sealing member.

The present invention provides, in a second aspect, a bridge piece for use with a fuel cell fluid flow plate. The fuel cell fluid flow plate has a face and a fluid opening for receiving a fluid, at least one flow channel in the face for distributing a fluid in a fuel cell, and a first groove defined within the face, the groove adapted to receive a sealing member. The bridge piece comprises a body having a first surface and a second surface. The first surface has at least one channel for fluidly connecting the fluid opening to the at least one flow channel. The second surface has a second groove defined therein to receive the sealing member.

The present invention provides, in a third aspect, a method for forming a fuel cell fluid flow plate assembly, which includes, providing a fluid flow plate having a face and a fluid opening for receiving a fluid. The fluid flow plate has at least one flow channel in the face for distributing a fluid in a fuel cell, and a first groove adapted to receive a sealing member, defined within the face. A bridge piece is provided, having a first surface and a second surface. The first surface has at least one channel, and the second surface has a second groove, adapted to receive a sealing member, defined therein. The bridge piece is placed relative to the fluid flow plate such that the at least one channel of the bridge piece fluidly connects the fluid opening to the at least one flow channel.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

Figure 2:
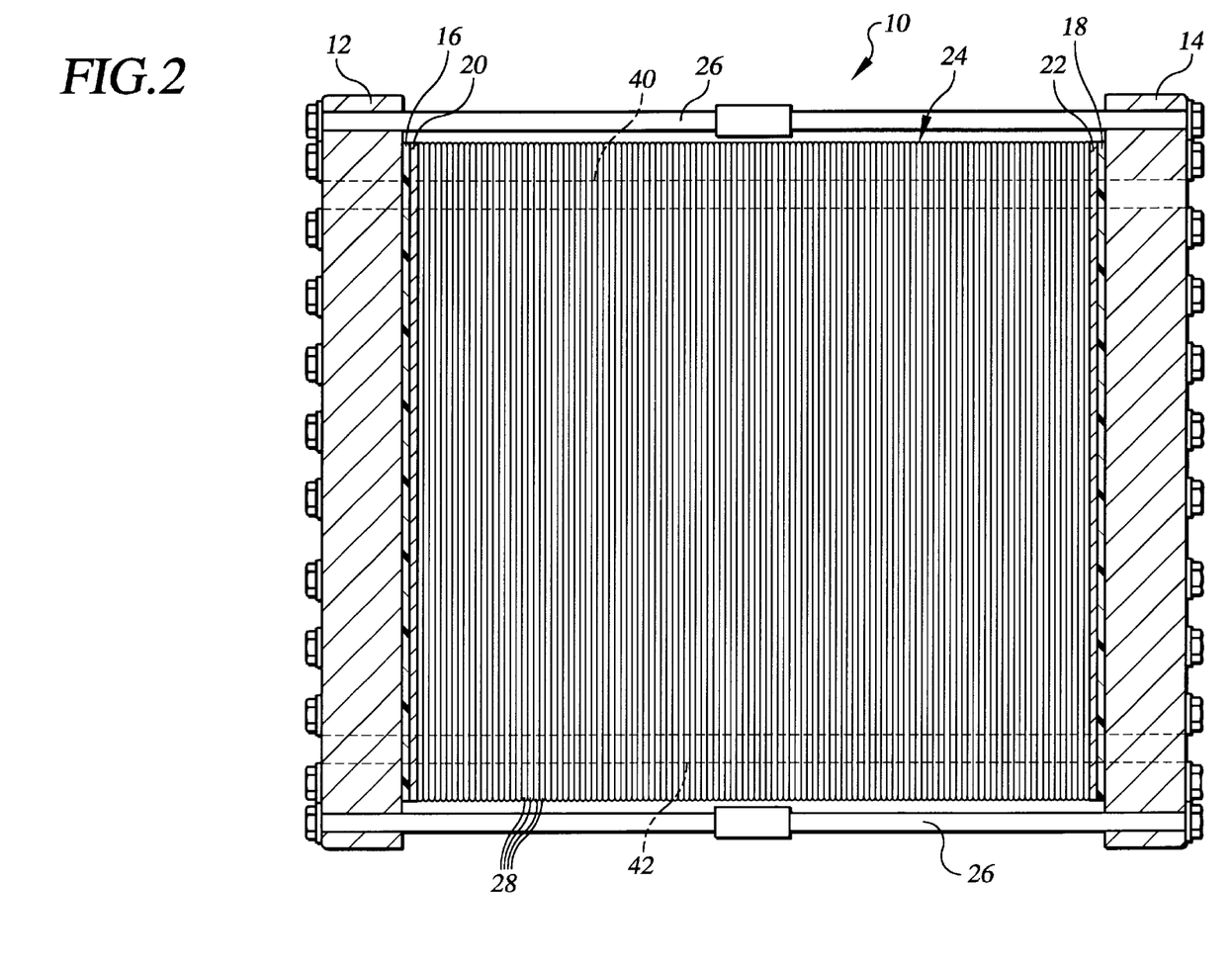
FIG. 2 is a front elevation view of one example of a fuel cell assembly incorporating and using an improved bridge piece in accordance with the present invention.

An example of a fuel cell assembly incorporating novel features of the present invention is depicted in FIG. 2. In this exemplary embodiment, a fuel cell stack 10 includes end plates 12 and 14, insulation layers 16 and 18, and current collector/conductor plates 20 and 22, with a working section 24 therebetween. The working section includes one or more active sections and can include a selected number of cooling sections, as will be understood by those skilled in the art. In one aspect of the present invention, the one or more active sections can further serve to perform cooling for the fuel cell assembly. A number of structural members 26 can be employed to join end plate 12 to end plate 14.

Working section 24 includes a number of layers 28. The layers generally form fluid manifolds for supplying reactant gas or fluids to, removing fluids from, and otherwise communicating and/or servicing fluids as desired within working section 24, as will be appreciated by those skilled in the art. The layers of fuel cell stack 10 might have applied thereto compressive forces.

A plurality of layers 28 may form one or more PEM-type fuel cells. The construction and utilization of PEM fuel cells is known in the art. By connecting an external load (not shown) between electrical contacts (not shown) of current collector/conductor plates 20 and 22, one can complete a circuit for use of current generated by the one or more PEM-type fuel cells.

Figure 3:
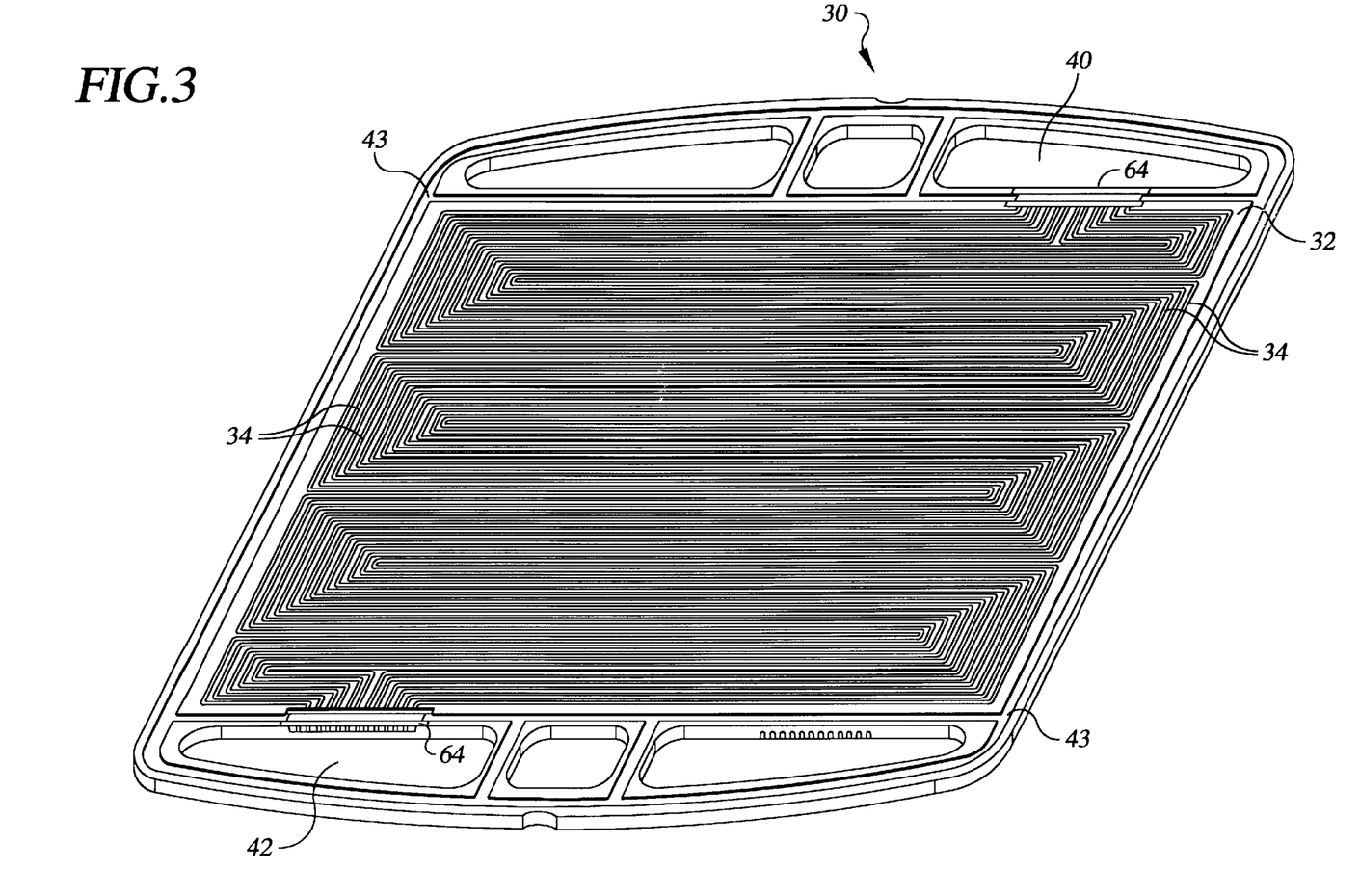
FIG. 3 is a perspective view of one example of a fluid flow plate incorporating and using an improved bridge piece in accordance with the present invention.

One example of a layer 28 of working section 24 is depicted in FIG. 3 as a fluid flow plate 30. Fluid flow plate 30 has a fluid flow face 32 with at least one generally serpentine flow channel 34 thereon. Flow channel 34 is in fluid communication with corresponding fluid entry manifold 40 and fluid exit manifold 42.

While multiple serpentine flow channels are illustrated in FIG. 3, it will be appreciated by those skilled in the art that the various embodiments of the fluid flow plates according to the present invention may include a plurality of continuous flow channels, e.g., a fluid flow plate having four quadrants, each with portions of a flow channel and/or separate flow channels, or a single flow channel having multiple sections.

Flow field plates may be commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Each flow field plate may be subjected to a sealing process (e.g., resin impregnation) in order to decrease gas permeation therethrough and reduce the risk of uncontrolled reactions. Flow field channels may be engraved or milled into a face of the rigid, resin impregnated graphite plate. Alternatively, the fluid flow plate may be injected molded with the flow channel formed on a surface of the plate.

In one example, fluid flow plate 30 serves as a flow field plate and flow channel 34 conducts fluid which includes reactant gas for fuel cell assembly 10. The reactant gas serves as fuel or oxidant for a given fuel cell. For instance, the flow channel can carry reactant gas (e.g., a fuel such as hydrogen or an oxidant such as air/oxygen) as well as a liquid (e.g., humidification and/or product water), as will be understood by those skilled in the art. In the context of this invention a reactant gas may be any substance which is classified as a fuel, such as substantially pure hydrogen, methanol reformate or natural gas reformate, or any substance classified as an oxidant such as substantially pure oxygen or oxygen containing air, as may be known in the art. Fluid flow plate 30 may be a bipolar, monopolar, or combined monopolar (e.g., anode cooler or cathode cooler).

A sealing member, e.g. gasketing material or gaskets may be employed within gasket groove 43, to seal and cooperate with the longitudinal extents of layers 28 in formation of the fluid supply manifolds. A given gasket might take the form of, for instance, a frame gasket made from a polytetrafluoroethylene ("PTFE") material manufactured by E. I. Du Pont de Nemours Company and sold under the trademark TEFLON®. Gasket groove 43 defines a sufficient volume in flow field plate 30 to house a gasket and/or gasketing material to seal and cooperate with the longitudinal extents of layers 28 in formation of the fluid supply manifolds.

Figure 4:
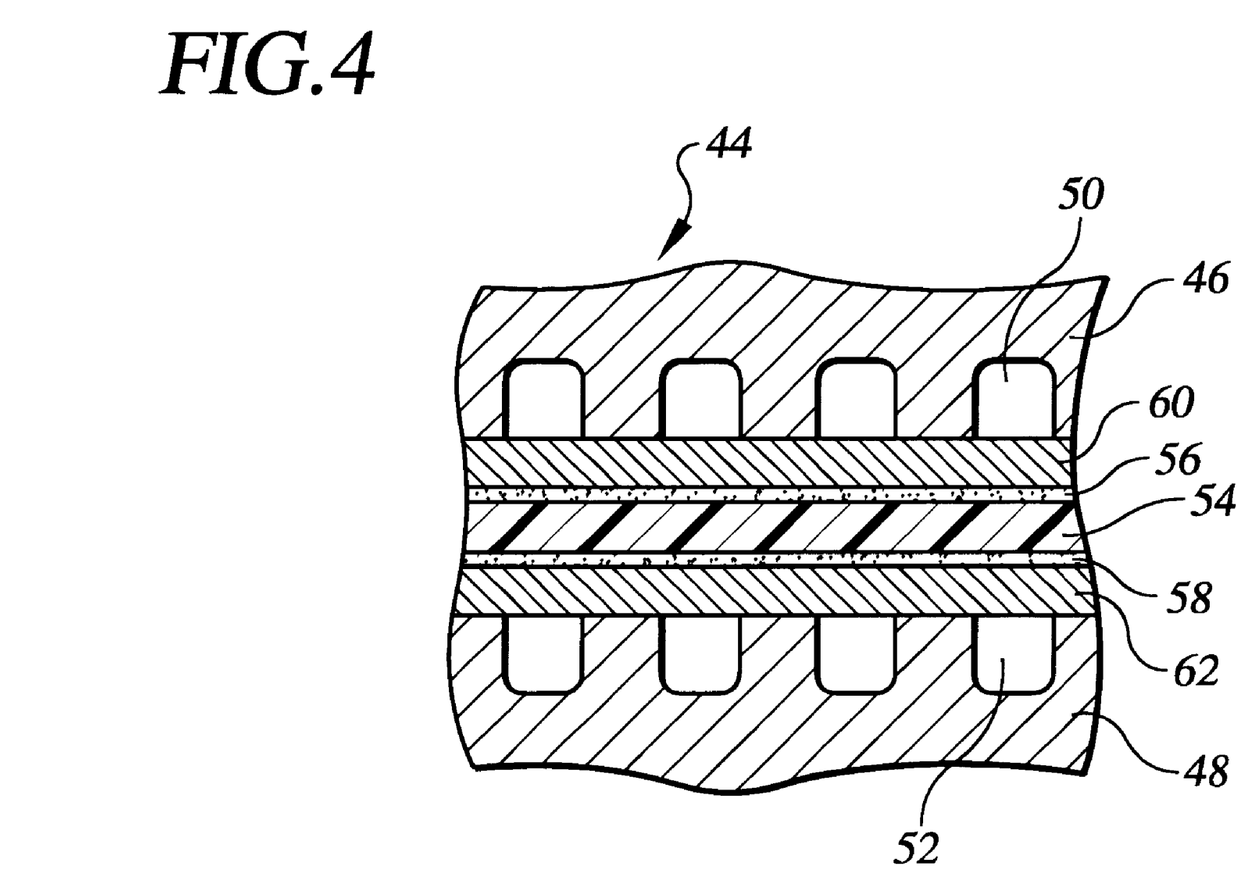
FIG. 4 is a partial cross sectional view of one example of a fuel cell.

For purposes of illustration, FIG. 4 depicts fuel cell 44 with fluid flow plates 46 and 48 serving as flow field plates. Fluid flow plates 46 and 48 may be of similar type and construction to fluid flow plate 30 described herein. In particular, fluid flow plate 46 might serve as an anode side of the fuel cell, and fluid flow plate 48 might serve as a cathode side of the fuel cell. That is, the face of fluid flow plate 46 might be an anode face, and the face of fluid flow plate 48 might be a cathode face. For instance, flow channel 50 of fluid flow plate 46 might carry hydrogen, as fuel, and humidification water. Further, a flow channel 52 of fluid flow plate 48 might carry air/oxygen, as oxidant, as well as humidification water and/or product water, as will be understood by those skilled in the art.

Fuel cell 44 includes a membrane or solid electrolyte 54. Preferably, solid electrolyte 54 is a solid polymer electrolyte made using a polymer such as a material manufactured by E. I. Du Pont de Nemours Company and sold under the trademark NAFION®. Further, an active electrolyte such as sulfonic acid groups might be included in this polymer. In another example, the solid polymer electrolyte might be formed with a product manufactured by W. L. Gore & Associates (Elkton, Md.) and sold under the trademark GORE-SELECT®. Moreover, catalysts 56 and 58 which facilitate chemical reactions, are applied to the anode and cathode sides, respectively, of solid electrolyte 54. Catalysts 56 and 58 may be constructed from platinum or other materials known in the art. This unit can be referred to as a "membrane electrode assembly" (hereinafter "MEA"). The MEA might be formed with a product manufactured by W. L. Gore & Associates and sold under the trade designation PRIMEA 5510-HS.

The MEA is sandwiched between anode and cathode gas diffusion layers (hereinafter "GDLs") 60 and 62, respectively, which can be formed with a resilient and conductive material such as carbon fabric or carbon fiber paper. In one embodiment of gas diffusion layers 60 and 62, porous carbon cloth or paper is infused with a slurry of carbon black and sintered with TEFLON® material.

The anode and cathode GDLs serve as electrochemical conductors between catalyzed sites of solid polymer electrolyte 54 and the fuel (e.g., hydrogen) and oxidant (e.g., air/oxygen) which each flow in anode and cathode flow channels 50 and 52, respectively. Further, the GDLs also present to the surfaces of the MEA a combination of microscopic porosity and macroscopic porosity. Microscopic porosity allows reactant gas molecules to pass generally longitudinally from the flow channel to a surface of the MEA. Macroscopic porosity allows product water formed at the cathode surface of the MEA to be removed therefrom by flowing generally longitudinally into the cathode flow channel, to prevent flooding of the catalyst particles.

Figure 5:
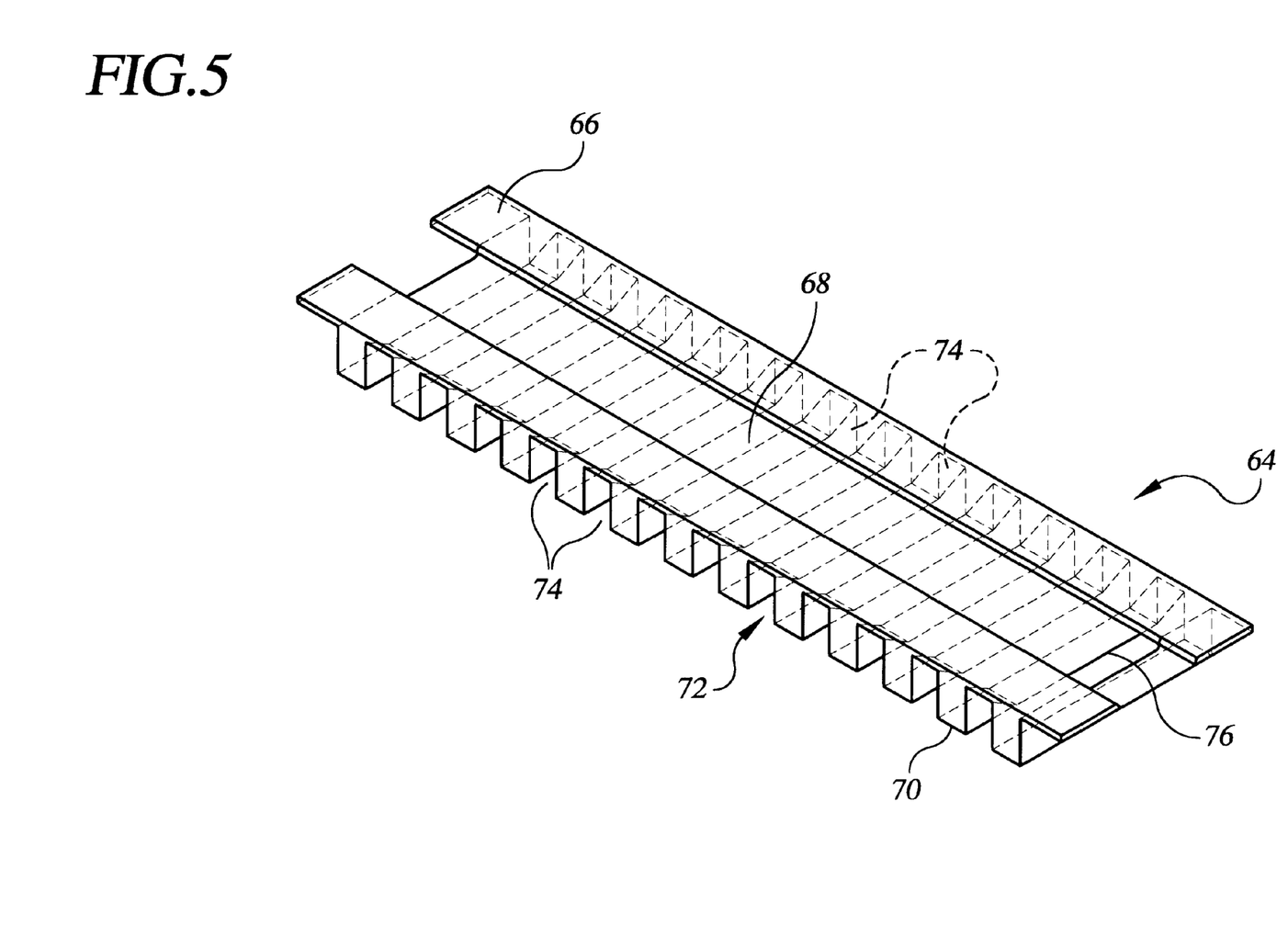
FIG. 5 is a perspective view of an improved bridge piece in accordance with the present invention.

FIG. 5 depicts one embodiment of a bridge piece 64 for insertion into a fluid flow plate of similar type and construction to fluid flow plate 30 described herein. The top surface 66 of bridge piece 64 is substantially planar in order to provide support for the stack component that rests on top of the bridge. Top surface 66 also includes a groove 68 which aligns with groove 43 of plate 30, and is adapted to receive a gasket and/or gasketing material to seal and cooperate with the longitudinal extents of the layers of a stack. The lower surface 70 of bridge piece 64 has a plurality of fluid flow channels 72 defined therein. Fluid flow channels 72 cooperate with the flow channels of the fluid flow plate to allow fluid communication with a corresponding fluid entry manifold and/or fluid exit manifold. Fluid flow channels 72 have ends 74, and a middle section 76. One or both ends 74 may have an increased cross sectional area to substantially reflect the configuration of the inlet portion of fluid flow channels 34 of plate 30. As shown in FIG. 5, ends 74 are tapered, thereby increasing the cross sectional area of fluid channel 72. One or both ends 74 may be tapered, rounded or have other configurations as may be known in the art, to optimize fluid flow through channel 72.

Bridge piece 64 may be constructed from any suitable material as may be known in the art. Bridge piece 64 may be produced by any of a variety of processes, such as compression of carbon powder into a coherent mass, subjecting the coherent mass to high temperature processes which bind the carbon particles together, and processing a portion of the mass into the desired size and shape of the bridge piece. Each bridge piece may be subjected to a sealing process (e.g., resin impregnation) in order to decrease gas permeation therethrough and reduce the risk of uncontrolled reactions. The groove 68 and flow channels 72 may be engraved or milled into top surface 66 and lower surface 70, respectively, of the bridge piece. Alternatively, the bridge piece may be injected molded with the groove and flow channels formed on the respective surface of the bridge piece. Other manufacturing processes, as may be known in the art, may also be employed.

Figure 6:
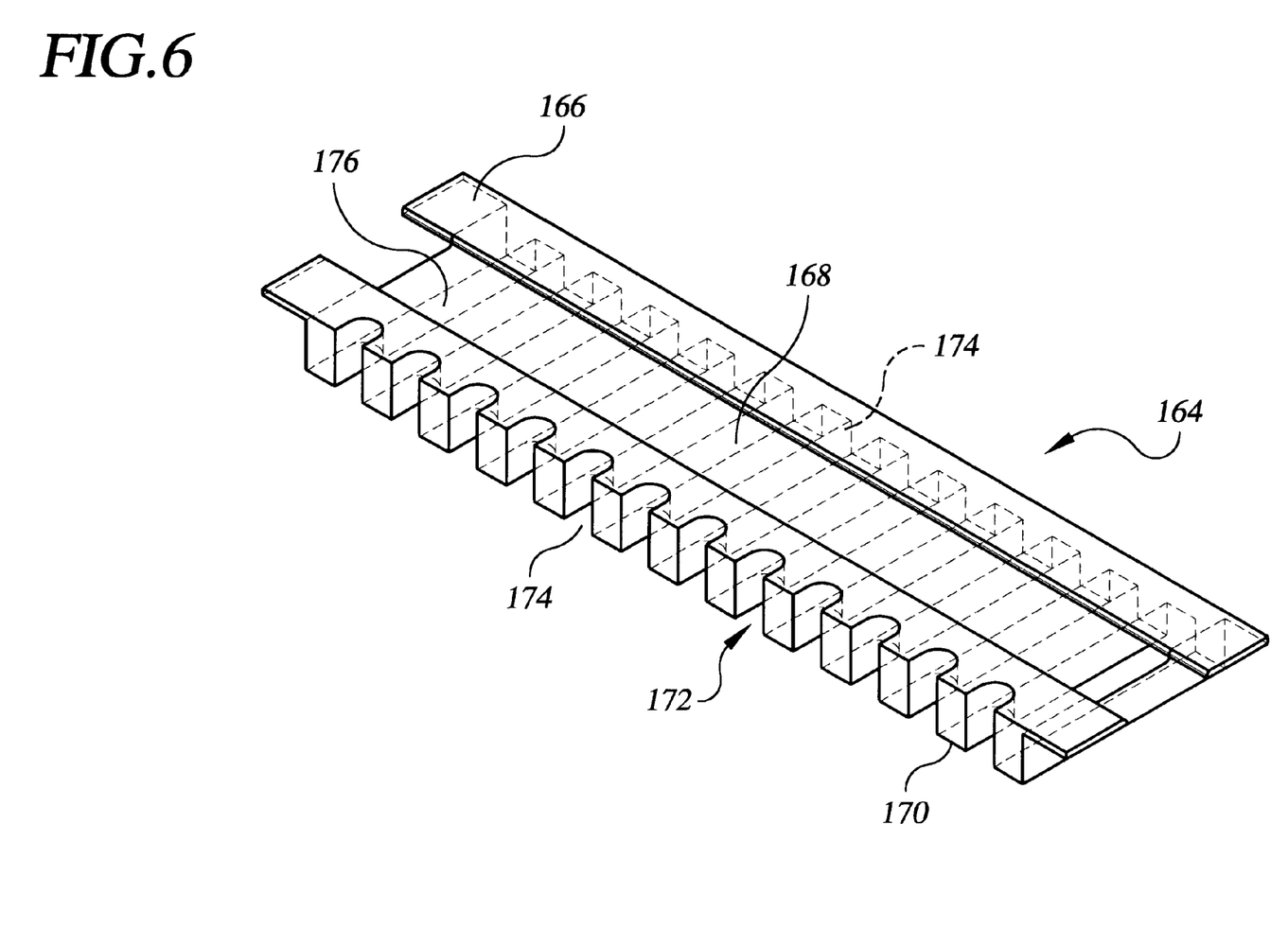
FIG. 6 is a perspective view of an alternative embodiment of an improved bridge piece in accordance with the present invention.

FIG. 6 depicts an alternative embodiment of a bridge piece 164 for insertion into a fluid flow plate of similar type and construction to fluid flow plate 30 described herein. The top surface 166 of bridge piece 164 is substantially planar in order to provide support for the stack component that rests on top of the bridge. Top surface 166 also includes a groove 168 which aligns with groove 43 of plate 30, and is adapted to receive a gasket and/or gasketing material to seal and cooperate with the longitudinal extents of the layers of a stack. The lower surface 170 of bridge piece 164 has a plurality of fluid flow channels 172 defined therein. Fluid flow channels 172 cooperate with the flow channels of the fluid flow plate to allow fluid communication with a corresponding fluid entry manifold and/or fluid exit manifold. Fluid flow channels 172 have ends 174, and a middle section 176. One or both ends 174 may have an increased cross sectional area to substantially reflect the configuration of the inlet portion of fluid flow channels 34 of plate 30. As shown in FIG. 6, one end 174 is rounded, thereby increasing the cross sectional area of fluid channel 172, while another end 174 maintains a uniform cross sectional area. One or both ends 174 may be tapered, rounded or have other configurations as may be known in the art, to optimize fluid flow through channel 172.

Figure 7:
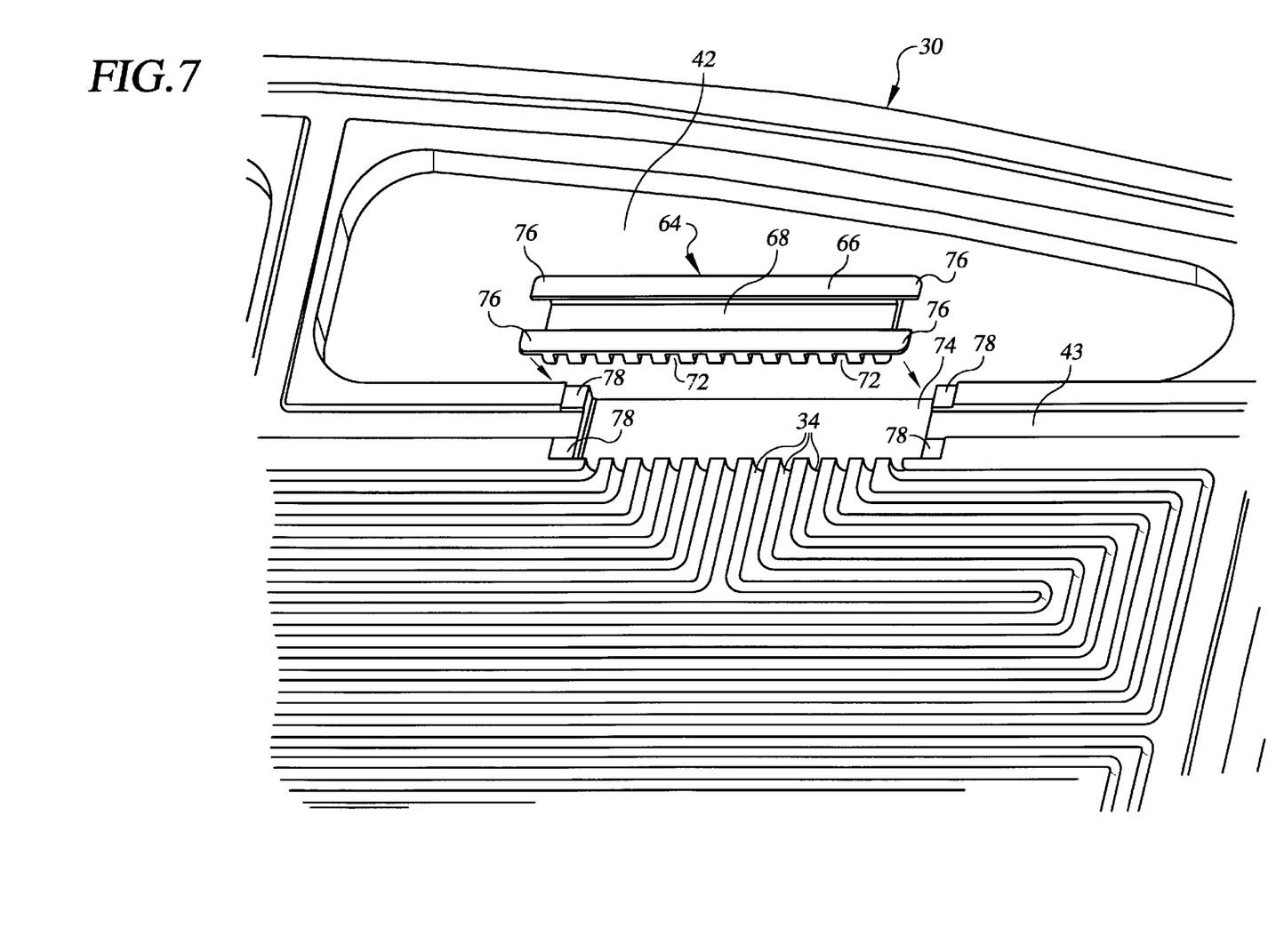
FIG. 7 is a perspective view depicting the installation of an improved bridge piece in accordance with the present invention.

FIG. 7 illustrates the insertion of bridge piece 64 into fluid flow plate 30. As can be seen, bridge piece 64 allows fluid flow from manifold 42 through fluid flow channels 72 and into flow channels 34, while at the same time providing a recessed groove 68 which operates with gasket groove 43 to allow a gasket or gasketing material to seal and cooperate with the longitudinal extents of the layers of a stack. Bridge piece 64 is positioned within opening 74 of fluid flow plate 30. Tabs 76 are configured to seat within recesses 78 of fluid flow plate 30.

Figure 8:
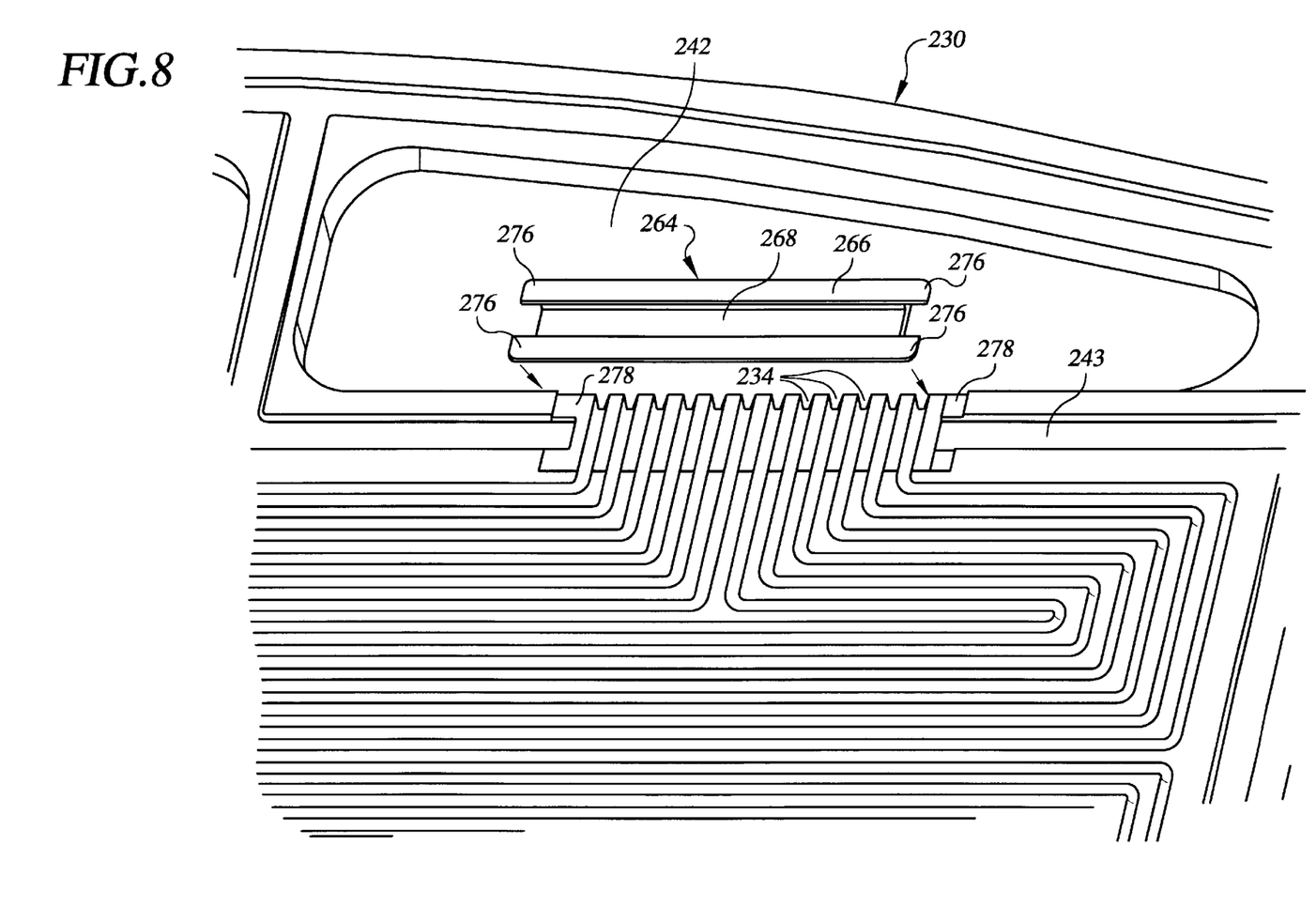
FIG. 8 is a perspective view depicting the installation of an alternative embodiment of a bridge piece in accordance with the present invention.

FIG. 8 illustrates an alternative embodiment of a bridge piece and fluid flow plate. In this embodiment, a force of fluid flow plate 230 has a plurality of flow channels 234 extending to the edge of fluid manifold 242. Bridge piece 264 has a groove 268 defined within its top surface 266. Groove 268 cooperates with gasket groove 243 to allow a gasket or gasketing material to seal and cooperate with the longitudinal extents of the layers of a stack. Tabs 276 are configured to seat within recesses 278 of fluid flow plate 230. The initial portion of flow channels 234 may be machined such that the channel entrances dip down under the surface of the bridge piece. This allows the gasket groove to continue through the bridge piece while maintaining the cross-sectional area of the channel.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fluid flow plate for a fuel cell, said fluid flow plate having a face and a fluid opening for receiving a fluid, said fluid flow plate comprising:

at least one flow channel in said face for distributing a fluid in said fuel cell;

a first groove defined within said face, said groove adapted to receive a sealing member; and a bridge piece having a first surface, said first surface having a second groove defined therein, said second groove being adapted to receive said sealing member when the bridge piece is positioned on said face.

2. A fluid flow plate as in claim 1, wherein said bridge piece has a second surface, and said bridge piece adjacent said fluid opening, said second surface at least partially defines a fluid passageway between said fluid opening and said at least one flow channel.

3. A fluid flow plate as in claim 1, wherein said fuel cell is located in a fuel cell stack, said fuel cell stack comprising a plurality of fuel cells.

4. A fluid flow plate as in claim 1, wherein said sealing member comprises a gasket.

5. A fluid flow plate as in claim 1, wherein said second groove and said first groove cooperate to form a continuous groove adapted, to receive said sealing member.

6. A fluid flow plate as in claim 1, wherein said second surface includes at least one channel for fluidly connecting said fluid opening to said at least one flow channel.

7. A fluid flow plate as in claim 6, wherein said at least one channel has an inlet and an outlet, and a middle portion, said inlet, said outlet and said middle portion each having a cross sectional configuration, and wherein the cross sectional configuration of the middle portion is different than at least one of said inlet and said outlet.

8. A fluid flow plate as in claim 6, wherein said second groove is transverse to said at least one channel.

9. A bridge piece for use with a fuel cell fluid flow plate, said fluid flow plate having a face and a fluid opening for receiving a fluid, at least one flow channel in said face for distributing a fluid in a fuel cell, and a first groove defined within said face, said groove adapted to receive a sealing member, said bridge piece comprising:

a body having a first surface, said first surface having a second groove defined therein, said second groove being adapted to receive said sealing member.

10. A bridge piece as in claim 9, wherein said sealing member comprises a gasket.

11. A bridge piece as in claim 9, wherein said second groove and said first groove cooperate to form a continuous groove adapted to receive said sealing member.

12. A bridge piece as in claim 9, wherein said bridge piece has a second surface with at least one channel for fluidly connecting said fluid opening to said at least one flow channel.

13. A bridge piece as in claim 9, wherein said at least one channel has an inlet and an outlet, and a middle portion, said inlet, said outlet and said middle portion each having a cross sectional configuration, and wherein the cross sectional configuration of the middle portion is different than at least one of said inlet and said outlet.

14. A bridge piece as in claim 9, wherein said second groove is transverse to said at least one channel.

15. A method for forming a fuel cell fluid flow plate assembly, comprising:

providing a fluid flow plate having a face and a fluid opening for receiving a fluid, at least one flow channel in said face for distributing a fluid in a fuel cell, and a first groove defined within said face, said groove adapted to receive a sealing member;

providing a bridge piece having a first surface and a second surface, said first surface having at least one channel, said second surface having a second groove defined therein, said second groove being adapted to receive said sealing member; and placing said bridge piece relative to the fluid flow plate such that said at least one channel of said bridge piece fluidly connects said fluid opening to said at least one flow channel.

\* \* \* \* \*